United States Patent [19]
Lambregts

[11] 3,840,200
[45] Oct. 8, 1974

[54] TURBULENCE COMPENSATED THROTTLE CONTROL SYSTEM

[75] Inventor: Antonous A. Lambregts, Renton, Wash.

[73] Assignee: The Boeing Company, Seattle, Wash.

[22] Filed: Mar. 19, 1973

[21] Appl. No.: 342,917

[52] U.S. Cl......... 244/77 D, 60/39.28 R, 340/27 SS
[51] Int. Cl........................................... B64c 13/18
[58] Field of Search............. 60/39.28 R; 235/150.2; 244/77 R, 77 D; 340/27 SS, 27 R; 73/178 R

[56] References Cited
UNITED STATES PATENTS

| | | | |
|---|---|---|---|
| 2,933,268 | 4/1960 | Jude et al. | 244/77 D |
| 2,948,496 | 8/1960 | Joline | 244/77 D |
| 3,240,447 | 3/1966 | Olshausen | 244/77 D |
| 3,448,948 | 6/1969 | Reerinic | 244/77 D |
| 3,627,236 | 12/1971 | Hess | 244/77 D |

*Primary Examiner*—Trygve M. Blix
*Assistant Examiner*—Stephen G. Kunin
*Attorney, Agent, or Firm*—Conrad O. Gardner; Glenn Orlob

[57] ABSTRACT

A system for processing signals representative of air speed error and inertial longitudinal acceleration in first and second channels respectively and providing cancellation of the turbulence induced components of the respective signals. A windshear detection circuit and filter circuit provide a signal representative of windshear induced acceleration which is subtracted from the inertial longitudinal acceleration signal in the second channel to compensate for windshear induced acceleration.

20 Claims, 5 Drawing Figures

TURBULENCE COMPENSATED THROTTLE CONTROL SYSTEM

This invention relates to throttle control systems for aircraft and more particularly to a throttle control system providing reduced throttle activity in turbulence.

In prior art speed controls, efforts have been made to compensate for the influences of turbulence, e.g., in U.S. Pat. No. 3,448,948 to REERINK, however only partial turbulence compensation has been achieved since the phenomenon and its effects do not appear to have been fully recognized or appreciated.

Accordingly, it is an object of this invention to provide a speed controller for aircraft wherein the influence of turbulence is suppressed and also windshear is detected and the influence thereof also suppressed.

In accordance with the present invention, it is recognized that a primary effect of a longitudinal gust hitting the aircraft is a drag change proportional to the speed change, causing an acceleration signal with 180° phase difference relative to the speed change. A secondary effect is caused by the response of the parameters pitch attitude ($\theta$) and angle of attack ($\alpha$) to the same gusts and results in an air speed error signal and longitudinal acceleration signals which have a 90° phase difference. A third effect occurs because the gust generally does not strike along the longitudinal axis, but has also a perpendicular component which directly affects $\alpha$, which in turn results in air speed error and longitudinal acceleration signals which have 90° phase difference.

The phase difference between the resulting air speed error and longitudinal acceleration signals induced by turbulence is therefore between 90° and 180° and is frequency dependent. In the high frequency range where the aircraft does not respond the phase angle approaches 180°, however secondary responses of the aircraft to the gust are dominant in the lower frequency range resulting in phase angles approaching 90°.

Having recognized the above complex phase relationship between the air speed error and longitudinal acceleration signals induced by turbulence it is a further object of this invention to provide throttle immunity to turbulence without compromising other performance aspects of the throttle control system.

The above and other objects of the present invention are achieved in accordance with a preferred embodiment by processing signals representative of air speed error and longitudinal acceleration. The phase lead of the acceleration signal may be increased relative to the air speed error signal to 180°, or, the air speed error signal may be lagged relative to the longitudinal acceleration signal to achieve the 180° phase difference relationship, or a combination of lead and lag networks may be utilized in accordance with the preferred embodiment of the invention as hereinafter described.

Further features and advantages of the invention will be apparent with reference to the specification and drawing wherein.

Figure 1:
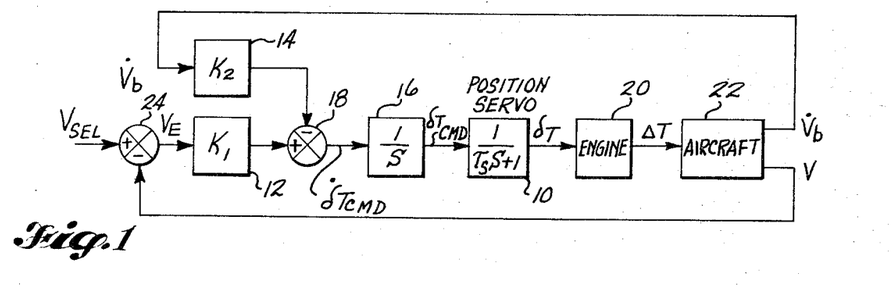
FIG. 1 is a simplified block diagram deemed helpful in understanding how the throttle command signal ($\delta_{TCMD}$) is developed in the present throttle control system.

Turning now to FIG. 1 which is a simplified block diagram of the present throttle control system, it can be determined that the basic throttle rate command signal ($\delta_{TCMD}$) is equal to $K_1 V_E + K_2 \dot{V}_b$, where $K_1$ and $K_2$ are constants and $V_E$ is a signal representative of air speed error relative to selected control speed while $\dot{V}_b$ is a signal representative of inertial longitudinal acceleration of the aircraft.

Then: $\delta_{TCMD} = K_1 (V_E + K_2/K_1 \dot{V}_b) = K_1 \cdot E$

This throttle rate command signal causes the throttles to move smoothly until:

$$E = V_E + K_2/K_1 \dot{V}_b = 0 \Rightarrow \dot{V}_b = (-K_1)/K_2 V_E \quad (1)$$

The system will minimize E so that equation (1) is closely satisfied resulting in a decay of the signal representative of air speed error so that the exact solution to equation (1) is approached whereby $$V_E = VE_{t=0} \cdot e^{-t/\tau_1} \quad (2)$$

where $\tau_1 = K_2/K_1$
and equation (2) then is representative of the desired ideal response of the system, E being a measure of the deviation from this ideal response.

The value of the gain of amplifier means $K_1$ determines the amount of deviation from the ideal response (overall tightness with which equation (1) is controlled), and $\tau_1 = K_2/K_1$ determines the air speed error decay time constant.

When the gains of amplifier means $K_1$ and $K_2$ are selected in the present rate command type system to give the same loop gains as in the known displacement type system, the present system provides improved throttle response and captures selected air speeds with minimal overshoots. The dynamic response characteristics of the engine and aircraft are the primary factors in determining the amplifier gains $K_1$ and $K_2$ which yield the desired speed control and speed control stability in the system of FIG. 1.

For large values of $\tau_1$, the amplifier gain $K_1$ can be selected to satisfy both air speed and throttle requirements. For decreasing values of $\tau_1$, the value of amplifier gain $K_1$ must increase to satisfy equation (1), and the basic control law as expressed by equation (1) for the simplified system of FIG. 1 still provides satisfactory air speed response. However, for decreasing $\tau_1$, throttle servo response to a step change in selected air speed in the system of FIG. 1 becomes underdamped. For a preferred value of time constant for speed control ($\tau_1$) of 10 to 15 seconds, throttle servo response can be improved by the addition of a throttle displacement input signal proportional to inertial longitudinal acceleration of the aircraft ($\dot{V}_b$) in the manner now shown in FIG. 2 where amplifier means having a gain $K_3$ is coupled back to the summing means which is directly coupled to the input of the throttle servo. In the throttle control system of FIG. 2, subsequent to a step change in selected air speed, the throttle servo first responds by providing a rate proportional to air speed error relative to selected control speed ($V_E$). The signal representative of inertial longitudinal acceleration of the aircraft ($\dot{V}_b$) gradually increases in amplitude and cancels the signal representative of air speed error relative to selected control speed ($V_{SEL}$). $\dot{V}_b$ lags the incremental throttle lever position ($\delta_T$) inputted to the engine by the engine lag time thereby causing the throttle to initially overtravel the position required to provide the ideal rate of change called for by the equation: $K_1 K_E + K_2 \dot{V}_b = 0$ The throttle displacement input signal proportional to inertial longitudinal acceleration of the aircraft ($\dot{V}_b$) is amplified by the gain $K_3$ to provide a throttle displacement equal and opposite to the aforementioned overtravel. For changes in selected air speed ($V_{SEL}$), the throttle will now move directly to the position which gives the commanded rate of change of air speed. The throttle control law for the system of FIG. 2 now satisfies the requirements for air speed select capture and tracking, and exhibits smooth limited throttle travel without overshoot.

Figure 2:
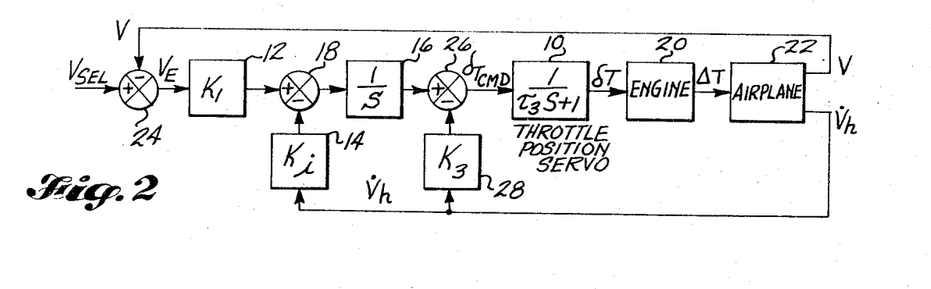
FIG. 2 is a block diagram similar to the block diagram of FIG. 1 however further including means for improving the servo response of the system of FIG. 1.
Figure 5:
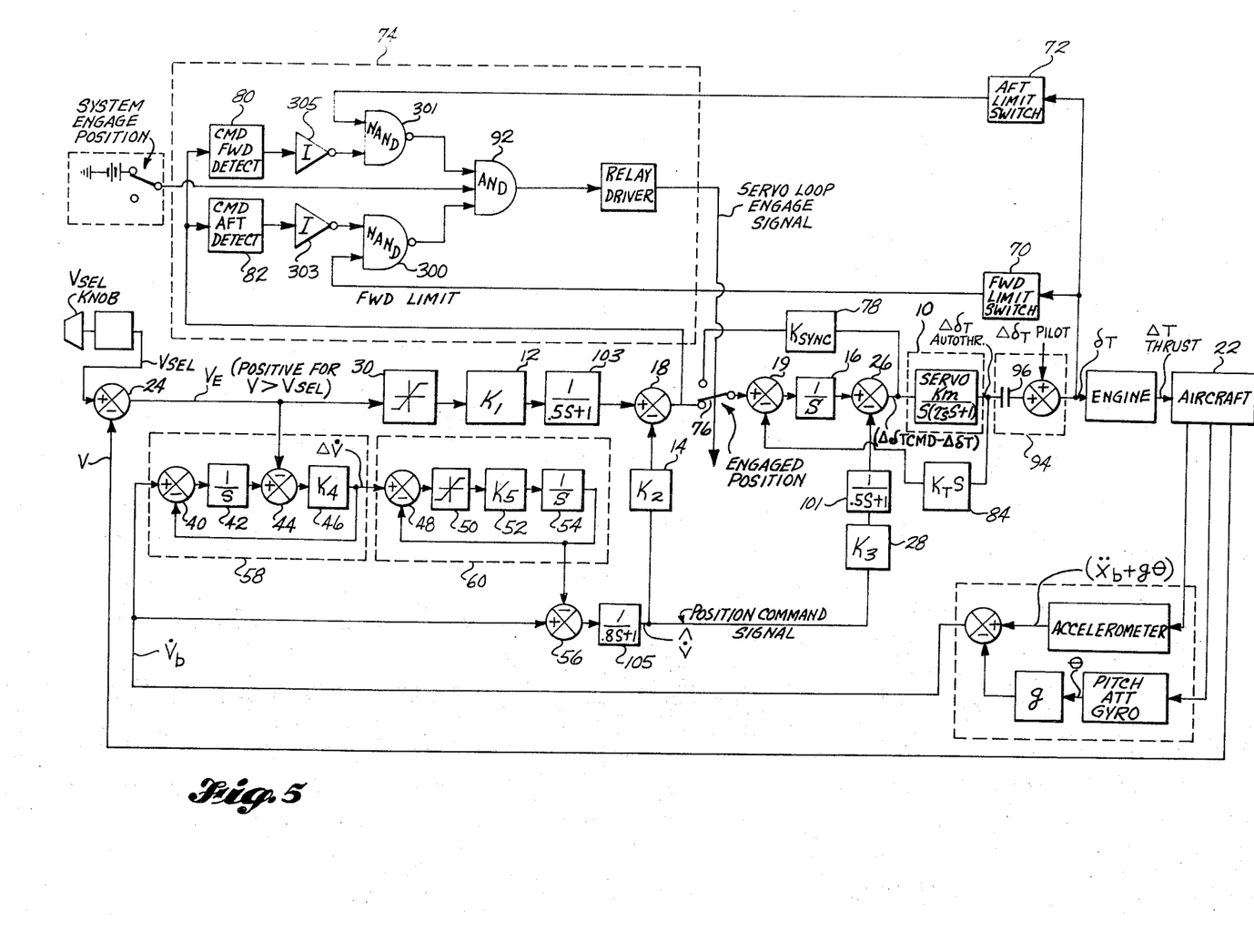

The throttle control system shown in the block diagram of FIG. 2 is linear and as a consequence will permit rates of change of air speed error proportional to air speed error itself. For large step commands it becomes desirable to limit the acceleration and deceleration levels for insuring passenger comfort and providing limitation of thrust transients. Accordingly, upon full implementation of the system of FIG. 2 as shown in FIG. 5, a limiter circuit 30 is provided in the first channel for processing signals representative of air speed error so that for air speed error signals greater than a predetermined air speed error limit, the control law is satisfied when $$\dot{V} = (-V_E \text{ limit}/\tau_1) = \dot{V} \text{ limit}$$

When during signal processing in the system of FIG. 5, $V_E$ decreases below the predetermined limit the aforementioned linear control referred to in connection with the system of FIG. 2 is resumed.

The throttle displacement input signal proportional to inertial longitudinal acceleration of the aircraft ($\dot{V}_b$) coupled to adder circuit 26 through the circuit path including amplifier means 28 having the gain $K_3$ as shown and previously discussed in connection with the description of FIG. 2, can be also seen in the full system implementation of FIG. 5. This input signal besides preventing throttle overtravel also provides for smooth capture of the commanded rate of change of air speed error in the present system. In the present system of FIG. 5, the air speed limit provided by limiter circuit means 30 was selected to give a $\dot{V}_b$ limit of about 1 knot/second.

Proceeding now to the gust filtering characteristics of the present system, it should be first noted that prior autothrottle systems have utilized a complementary filter having a time constant ($\tau$) of from 2 to 5 seconds to reduce the effect of turbulence on throttle activity. Due to the occurrence of extremely high rates of change combined with relatively low frequencies of air speed perturbations in turbulence, such a complementary filter does not adequately attenuate nuisance throttle activity. Also for increasing values of gust filter time constant ($\tau$), the autothrottle coupling with the path control autopilot has a tendency to deteriorate. The basic aircraft response to a longitudinal air mass velocity disturbance may be represented by the following equations:

$$VE / \Delta V \text{ air mass} = \tau_2 S / \tau_2 S + 1$$

where $\tau_2$ is the speed response time constant due to a thrust-drag difference
and $\dot{V}b/\Delta V$ air mass $= (-S/\tau_2 S + 1)$ assuming the aircraft is speed stable. Therefore the primary throttle response in turbulence due to the combined signals $K_1 V_E + K_2 \dot{V}_b$ becomes $K_1(V_E + \tau_1 \dot{V}_b) = K_1[\tau_2 S/\tau_2 S + 1 \Delta V \text{ air mass} - (\tau_1 S/\tau_2 S + 1) \Delta V \text{ air mass}]$ and this can be reduced to zero by selecting $\tau_1 = \tau_2$. Practically, this is possible only where the natural speed response time constant $\tau_2$ has a value which is also acceptable for the controlled speed response time constant ($\tau_1$). However, a substantial amount of secondary throttle activity would still occur due to excitation of pitch attitude $\theta$ and angle of attack $\alpha$ which in turn induce accelerations and air speed errors having a relative phase difference of 90°. As a result, the phase difference between the total acceleration and air speed error signal varies from 180° to 90° depending on frequency.

Total signal cancellation is possible only when the relative phase angle is 180°. This is accomplished by a combination of lead/lag circuits in the acceleration signal path and air speed error signal path. First, the proportional displacement term $K_3 \dot{V}$ was found to improve both throttle servo damping and throttle response to the lower range of turbulence frequencies by providing extra lead in the throttle command due to the acceleration signal $\dot{V}$, thereby approaching a phase angle of 180° between the individual throttle commands due to air speed error and acceleration.

To avoid accelerometer noise reaching the throttle command, this throttle command signal proportional to acceleration is filtered by the small lag provided by filter 101 resulting in a throttle position command due to $\dot{V}_b$ of:

$$(\delta T) \dot{V}_b = (K_2/S + K_3 / 0.5 S + 1) \cdot \dot{V}_b$$

Additional phase correction is obtained by introducing a small lag in the air speed error signal channel resulting in a throttle position command due to air speed error of:

$$(\delta T) VE = K_1/(0.5 S + 1) S \cdot V_E$$

These small lags provided by filter 103 and 101, do not have appreciable influence on the normal system dynamics. The required characteristics of lag filter 103 to bring about the desired 180° phase difference between throttle commands resulting from turbulence induced air speed error and longitudinal acceleration are determined by computing the individual open loop throttle command Bode plots due to each of these signals. From these two Bode plots, the required air speed error lag filter 103 was constructed. Using this technique it was found that a 0.5 second lag in the signal $V_E$ representative of air speed error together with optimization of the relative gains ($K_1$, $K_2$ and $K_3$) produced excellent turbulence cancellation for frequencies higher than 1.0 rad./sec. In the frequency range above 1.0 radians per second, turbulence cancellation can be improved by insertion of 0.8 seconds lag filter 105 in the $\dot{V}_b$ signal channel.

The equation for the total autothrottle control law of the system of FIG. 5 can now be given with the above mentioned $V_E$ and $\dot{V}$ lags included and is: $\delta_{TCMD} = (K\, V_E/0.5\,S + 1 + K_2\, \dot{V}/0.8\,S + 1)\, 1/S - K_3\, \dot{V}/(0.8\,S + 1)(0.5\,S + 1)$ The lack of throttle response what may presently be termed a "tuned" control law to velocity disturbances in the air mass would however result in low quality performance in windshear, and therefore the previously discussed control law representative of the system of FIG. 5 but without the circuits 58 and 60 is inadequate in terms of shear performance. The following immediate description relates to the problem of air speed error control in sustained windshear and development of a circuit comprising a shear detector having low turbulence sensitivity which may be utlized in the present autothrottle control system of FIG. 5.

Air speed errors due to windshear can be made the overriding control input by washing out the $\dot{V}_b$ signal and complementing it with derived rate to make up for the loss of $\dot{V}_b$ signal and the performance in windshear can be made satisfactory for vlaues of $\tau$ less than 10 seconds, but the derived air speed rate reintroduces the throttle activity problem in turbulence and therefore this approach is unsatisfactory. Even the utilization of a linear second order complementary filter in such an approach cannot provide sufficient turbulence suppression while allowing adequate shear performance. A further disadvantage of such an approach utilizing linear filters is the requirement of a separate speed input signal to complement the washed out signal $\dot{V}_b$. Use of the signal $V_E$ would result in throttle response having excessive overshoots for step changes in the commanded air speed due to rate taking of the step input. The use of additional in-series-filtering on the signal $\dot{V}$ would degrade air speed tracking performance which cannot be tolerated. As a consequence of the preceding, the circuit 58 of FIG. 3 was conceived to actually detect a sustained windshear and correct the control law of the present autothrottle control system by providing a windshear correction signal component ($\Delta \dot{V}$) for subtracting from the signal representative of longitudinal acceleration of the aircraft ($\dot{V}_b$) to provide a signal representative of longitudinal acceleration of the aircraft compensated for windshear ($\hat{\dot{V}}$). In this manner the air speed select and tracking performance are preserved, however the signal $\Delta \hat{\dot{V}}$ has a substantial turbulence noise content.

Figure 3:
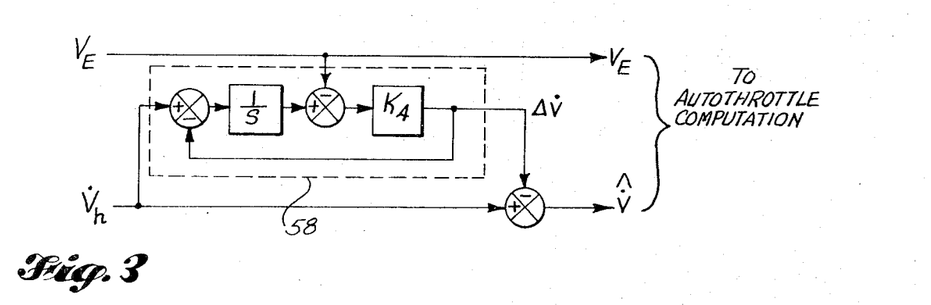
FIG. 3 is a block diagram of a circuit for isolating the windshear correction term ($\Delta \dot{V}$) utilized in the present autothrottle control system.

In FIG. 3: $\hat{\dot{V}} = \dot{V}_b - \Delta \dot{V} = \dot{V}_b - (\dot{V}_b - {}_{STE})\, K_4/S + K_4$ When there is no turbulence or windshear $\dot{V}_b = SV_E$ and therefore $\hat{\dot{V}} = \dot{V}_b$.

Figure 4:
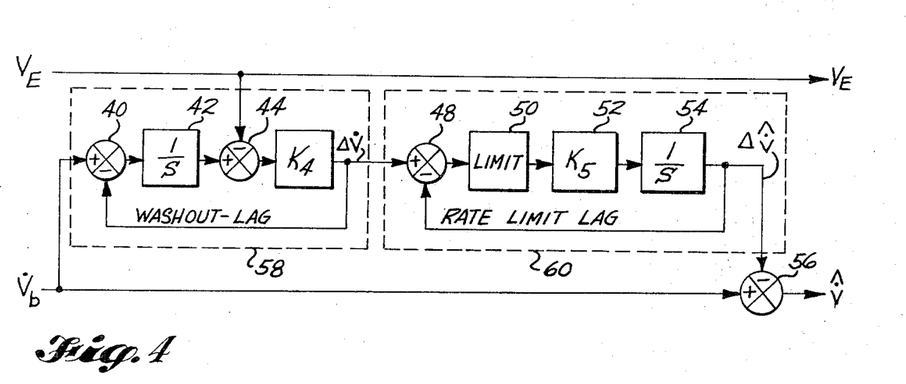
FIG. 4 is a block diagram of a windshear detector circuit utilized in the present throttle control system and which is similar to the circuit of FIG. 5 and includes a rate limited lag circuit for filtering out of the signal representative of the windshear correction term ($\Delta \dot{V}$) the high frequency components of the rate of change of air speed due to random atmospheric turbulence; and, FIG. 5 is a block diagram of the preferred embodiment of the present throttle control system utilizing the shear detector circuit of FIG. 4 for providing shear compensation.

Under windshear conditions, that portion of $\dot{V}_b$ which does not cancel against the derived rate of change of air speed error, wll form the windshear correction term $\Delta \dot{V}$ for compensating the signal $\dot{V}_b$ for windshear. In the circuit of FIG. 3, the windshear correction signal $\Delta \dot{V}$ is isolated and provided in a single signal path as an input to the adder in the $\dot{V}_b$ signal channel, and as a consequence may be filtered as shown in FIG. 4 to permit only the desired low frequency windshear component to be added. In the design of the present shear detector circuit, turbulence and windshear are distinguished on the basis of frequency differences and their effect on the controllability.

The controllability of a wind disturbance by an autothrottle system depends upon the engines thrust response to throttle lever changes and the aircraft's speed response to thrust changes. The engine may be represented by a 1 to 2 second first order lag and the aircraft with a time constant of 10 to 15 seconds. Efficient control of wind disturbances, that is, without excessive throttle activity, is therefore possible only for frequencies lower than 1/15 radian per second or about 0.01 cycles per second. Additional lags in the autothrottle control law further degrade the controllability of atmospheric wind disturbances. Frequency response plots of the transfer function $V_E/\Delta V_w^{wind}$ and $\Delta \delta T/\Delta V_w^{wind}$ where $\Delta \delta T$ is the change of throttle lever position in a known autothrottle system showed that speed errors $V_E$ increased due to the operation of the autothrottle system for frequencies of $\Delta V$ wind higher than about 0.01 cycles per second. Therefore in the present control law of FIG. 5 throttle response to atmospheric wind disturbances above 0.01 cycles per second was minimized. A further distinction between turbulence and windshear is found in the rate of change of air speed $\dot{V}_E$. In windshear, on approach, the maximum $\dot{V}_E$ due to windshear is about 1 knot per second. However, in turbulence $\dot{V}_E$ goes to several orders of magnitude higher for short periods to time. These high values of $\dot{V}_E$ in turbulence which would cause the undesired throttle activity can be filtered out entirely as seen in FIG. 4 by the rated limited lag circuit 60. The time delay on the windshear correction signal $\Delta \dot{V}$ permitted is limited by the requirement for adequate windshear performance. The lowest possible rate limit is therefore a function of the time constant of washout and lag circuit means 58. Since the rate limited lag circuit means 60 is more effective than washout and lag circuit means 58 in attenuatng response to turbulence, adequate shear performance with maximum turbulence attenuation is therefore obtained by a combination of a small washout and lag circuit 58 time constant and a low rate limit in circuit 60. This small time constant for washout and lag circuit 58 is also desired for minimizing the undesired $\Delta \dot{V}$ signal in case of a step change in $V_E$ caused by speed command input $V_{SEL}$ (see FIG. 5) changing $V_E$ in FIGS. 4 and 5. With a small time constant for circuit means 58, the shear correction term $\Delta \hat{\dot{V}}$ is detected without appreciable delay and the windshear performance is then substantially dependent upon the loop gain $K_5$ and the rate limit of circuit 60.

Further considerations in the design of the present shear detector circuit already described having low sensitivity to turbulence comprising circuits 58 and 60 for providing the correction term $\Delta \hat{\dot{V}}$ to be subtracted from $\dot{V}_b$ are now noted. It was noted earlier that a single complementary washout and lag type filter having a time constant of 10 seconds provided adequate windshear performance. This allows $\Delta \hat{\dot{V}}$ to be built up with a rate of 0.1 knot per second² for a step input of 1 knot per second. The rate limit for limiter circuit 50 in the present rate limited lag circuit 60 may therefore be set at 0.1 knot per second² for a loop gain $K_5$ of 0.1. A further consideration affects the selection of the values of gains $K_4$, $K_5$, of amplifier circuit means 46 and 52 respectively and the rate limit of limiter circuit 50 in the system of FIG. 5. The smaller the rate limit selected, and the higher gain value $K_4$ that is chosen, the higher percentage of time the rate limit circuit 50 will be saturated by turbulence thus preventing the development by circuits 58 and 60 of a signal $\Delta \dot{V}$ to be subtracted from the signal $\dot{V}_b$ to provide a signal $\dot{V}$ representative of longitudinal acceleration which is corrected for windshear. Shear detection and compensation as provided by circuits 58 and 60 coupled between the $V_E$ signal channel and the $\dot{V}_b$ signal channels would in such a case be adversely affected by the level of turbulence. This is minimized by the present system design by selecting $K_4 = 5$, $K_5 = 0.2$ and a rate limit of 0.2 knots per second$^2$. These values sufficiently suppress turbulence response of the present shear detector circuit and do not deteriorate the turbulence immunity of the present autothrottle control system. The present shear detector utilizes as an input, the air speed error signal $V_E$ without affecting autothrottle system performance for step changes in air speed. For a step introduction of a 1.0 knot per second windshear in smooth air, the peak value of air speed error remains limited to about 4 knots.

Turning now to FIG. 5 a further advantageous feature of the present rate command type autothrottle system will be noted in the mode of operation occurring when either the forward or aft throttle limit position is reached. When either of these two autothrottle conditions is detected by the closing of one of throttle limit switches 70 or 72, autothrottle limit logic circuit 74 generates at the output thereof a servo loop disengage signal causing switching means 76 to close a signal path including synchronizing amplifier 78 from the output of adder 26 back to the input of adder 19 thereby synchronizing the total servo command input to servo means 10 to zero. The present autothrottle control system is reengaged subsequently when the sum $K_1 V_E + K_2 \dot{V}$ changes sign (polarity from zero). Sign detector circuit 80 or 82 detect the positive or negative polarity change respectively of this sum as provided at the output of adder circuit 18. This circuitry to provide anticipation of throttle command to drive the throttle out of the limit position is therefore porportional to $\dot{V}$, as required to provide capture of the selected speed $V_{SEL}$ asymptotically. The total servo position error, ($\delta T_{CMD} - \Delta \delta T$) is synchronized to zero when switching circuit 76 is in the disengaged position to insure that the servo 10 comes out of the limit position without a step transient. Such a step transient could occur due to the presence of the position command signal proportional to acceleration coupled through amplifier 28 and present as an input to adder 26, if this signal was not zeroed by the synchronization loop. Switching means 76 is driven to the engage position when the output of AND circuit 92 is high, which requires that the system engage switch 90 is engaged and both outputs of circuit 301 and 300 are high.

The output of circuit 300 is normally high except when circuit 70 is high, signifying that the forward throttle limit is reached and circuit 82 is low further signifying that there is no command to drive the throttles aft, so that in this case both inputs to circuit 300 are high and the output of circuit 300 is low. The output of circuit 301 is normally high except when circuit 72 is high signifying that the aft throttle limit is reached and circuit 80 is low further signifying that there is no command to drive forward, so that in this case both input to circuit 301 are high and the output of circuit 301 is low.

The gain value for K sync amplifier 78 determines how fast the position error is nulled out. For a gain factor of 10 the position error goes to zero in less than 1 second.

The feedback loop for the position servo 10 comprises tachometer means 84 coupled from the output of servo 10 back to an input of adder circuit 19. If the servo motor 10 rotates at a given rate, then the throttle position $\iota_T$ is a ramp function. Mathematically the change in throttle position $\Delta \delta_T$ is the integration of the servo or throttle rate, that is $\Delta \delta_T = \delta_T/S$. The tachometer 84 is actually a generator which produces a signal proportional to the angular velocity of the motor 10 or proportional to the differentiated throttle position that is $\dot{\delta}_T = S \delta_T$. Throttle position as the feedback signal is obtained using the tachometer signal $K_T S \delta_T = K_T \dot{\delta}_T$, which is then integrated in circuit 16 yielding $K_T/S \dot{\delta}_T = K_T \Delta \delta_T$ thereby providing an output signal proportional to the actual position change $\Delta \delta_T$ utilized to cancel the throttle position command signal $\Delta \delta_T CMD$ at adder circuit 26. The servo 10 therefore sees a signal outputted from adder 26 which is proportional to the difference of throttle position command provided in the system of FIG. 5 in accordance with the present autothrottle control law and the signal representative of actual throttle position change $\Delta \delta_T$. The throttle servo motor 10 will therefore run with an angular velocity proportional to the position error of the throttle 94 and come to a stop only when true position error has reached zero.

The servo motor 10 drives the throttle means 94 through a clutch means 96 which is normally engaged. The throttle levers indicative of throttle position 98 control the amount of fuel passing to engine 99. When the pilot applies a force to the throttle levers denoted $\Delta \delta_T$ pilot, clutch means 96 disengages so that the throttle servo 10 no longer drives the levers. This allows the pilot to take over throttle control at any time.

A highlight of the present autothrottle control system is operation with high air speed error integral gain and this is made possible because the basic response characteristics are determined by the relative values of air speed error and acceleration gains provided in the system. All gains may therefore be increased together to satisfy requirements for high air speed error integral gain required for aircraft configuration changes without substantially deteriorating other performance areas of the system such as air speed select change performance and response of the system in turbulence.

Where it is desired to utilize the system of FIG. 5 in a decelerating approach mode, the air speed error signal $V_E$ developed as an input to the present system will be the difference between commanded air speed $V_{SEL}$ and actual air speed; however, $V_{SEL}$ would be inputted as a function of flap position which in turn is a function of altitude above the runway. However, the system of FIG. 5 would in the decelerating approach mode of operation require an extra deceleration command signal summed in the signal path $\dot{V}$ with this shear corrected $\dot{V}$ signal, e.g., at adder circuit 56. The decelerating command signal to be summed is derived by differentiating the flap-programmed speed command signal.

Returning now briefly to the shear detector circuit means including the actual detector circuit 58 and correction signal generating circuit 60 responsive to circuit 58, it was noted that the present shear detector circuit in essence corrects the discrepancy between the air speed error sensor signal and the accelerometer signal in the low frequency range (e.g., below 0.1 rad/sec) without allowing higher frequency disturbances of the control reference signal (air speed error $V_E$) to increase the noise content in subsequent signal processing of these signals. The present shear detector circuit means thus has application in other systems which require air speed referenced longitudinal acceleration. It should be noted that the circuit corrects for all long term errors including, e.g., errors due to accelerometer attitude errors causing the accelerometer to detect gravity components. Therefore, the circuit may be further utilized in applications requiring correction of long term discrepancies between a pair of control reference and damping signal sensors such as altitude and altitude rate signal sensing means or altitude rate and normal acceleration sensing signal means.

What is claimed is:

1. In combination with an automatic speed control system for an aircraft employing means responsive to a position command signal, an apparatus providing said position command signal substantially free from turbulence noise, comprising:
   means for processing a signal representative, respectively, of air speed error relative to selected air speed and inertial longitudinal acceleration of the aircraft to provide a first control signal;
   means responsive to said signal representative of inertial longitudinal acceleration of the aircraft for providing a second control signal; and means subtracting said second control signal from said first control signal to provide said position command signal compensated for overtravel due to engine lag.

2. In combination in an aircraft throttle control system having a throttle position servo:
   means for processing a signal representative respectively of air speed error relative to selected air speed and inertial longitudinal acceleration of the aircraft to provide a first control signal;
   means responsive to said signal representative of inertial longitudinal acceleration of the aircraft for providing a second control signal;
   means for subtracting said second control signal from said first control signal to provide a throttle command signal compensated for overtravel due to engine lag time; and
   means for coupling said compensated throttle command signal to the input of said throttle position servo.

3. The invention according to claim 2 wherein said means responsive to said signal representative of inertial longitudinal acceleration comprises amplifier means.

4. An autothrottle control system comprising in combination:
   integrator circuit means having an input terminal and an output terminal;
   means for providing the gain weighted sum of signal representative of air speed error and air speed control damping, said means having an output terminal;
   said input terminal of said integrator circuit coupled to said output terminal of said means for providing the gain weighted sum;
   the output of said integrator circuit means coupled to the input terminal of a summing circuit means;
   said summing circuit means also responsive to a separately processed signal representative of air speed control damping;
   servo means having an input terminal coupled to the output terminal of said summing circuit means and an output terminal coupled to the throttle of said autothrottle control system, for driving said throttle;
   synchronizing amplifier means having an input terminal coupled in circuit between the output terminal of said summing circuit means and the input terminal of said servo means, said synchronizing amplifier means further having an output terminal;
   switching means for coupling said output terminal of said synchronizing amplifier means to the input terminal of said integrator circuit means when the forward or aft throttle limit of said throttle is reached thereby synchronizing the throttle position to zero;

means for detecting a change in the sign of signals present

5. In combination in an autothrottle control system for an aircraft;
   first means for providing a signal representative of air speed error;
   second means for providing a signal representative of longitudinal acceleration;
   first adder circuit means having first and second input terminals and an output terminal;
   first limiter circuit means;
   first amplifier circuit means;
   first filter circuit means;
   said first limiter circuit means, first amplifier circuit means and first filter circuit means coupled in series circuit between said first means for providing a signal representative of air speed error and said first input terminal of said first adder circuit means;

second adder circuit means having first and second input terminals and an output terminal, said first input terminal coupled to said second means for providing a signal representative of longitudinal acceleration;
   rate limited lag circuit means having an input terminal and an output terminal;
   washout and lag circuit means having third adder circuit means, first integrator circuit means, fourth adder circuit means and second amplifier circuit means connected in series circuit between said second means for providing a signal representative of longitudinal acceleration and said input terminal of said rate limited lag circuit means;
   said rate limited lag circuit having fifth adder circuit means, second limiter circuit means, third amplifier circuit means, and second integrator circuit means coupled in series circuit between said input and output terminals thereof;
   said output terminal of said rate limited lag circuit means coupled to said second input terminal of said second adder circuit means;
   second filter circuit means having an input terminal and an output terminal, said input terminal connected to said output terminal of said second adder circuit means;

fourth amplifier circuit means coupled between said output terminal of said second filter circuit means and said second input terminal of said first adder circuit means;

sixth adder circuit means having first and second input terminals and an output terminal;

third integrator circuit means having an input terminal and an output termial;

seventh adder circuit means having first and second input terminals and an output terminal;

said input terminal of said third integrator circuit means coupled to said output terminal of said sixth adder circuit means, said output terminal of said integrator circuit means coupled to said first input terminal of said seventh adder circuit means;

servo and throttle means coupled in series between the output of said seventh adder circuit means and the propulsion means for the aircraft;

synchronizing amplifier means having an input terminal and an output terminal, said input terminal coupled to the output terminal of said seventh adder circuit means;

tachometer means having an input terminal coupled to the output of said servo means, and an output terminal coupled to said second input terminal of said sixth adder circuit means; and switching means coupling said first input terminal of said sixth adder circuit means to said output terminal of said first adder circuit means or to said output terminal of said synchronizing amplifier means.

6. The invention according to claim 5 further comprising fifth amplifier circuit means and third filter circuit means coupled in series circuit between said output terminal of said second filter circuit means and said second input terminal of said seventh adder circuit means.

7. The invention according to claim 5 wherein said signal representative of air speed error is a function of the flap position of the aircraft.

8. The invention according to claim 5 further including
means for detecting forward and aft positions of said throttle means;
autothrottle limit logic circuit means responsive to said detecting means for actuating said switching means.

9. In combination with an automatic control system for controlling the airspeed of an aircraft relative to a control reference speed and including means responsive to a command signal, an apparatus providing said command signal substantially free from turbulence noise, comprising:
first means for receiving, amplitude limiting and filtering a signal representative of airspeed error;
second means for receiving, compensating for wind shear, and filtering a signal representative of inertial longitudinal acceleration;
third means for amplifying, combining and processing said amplitude limited and filtered airspeed error signal and said wind shear compensated and filtered inertial longitudinal acceleration signal to provide a first component of said command signal;
fourth means for amplifying and processing said wind shear compensated and filtered inertial longitudinal acceleration signal to provide a second component of said command signal;
fifth means for combining said first and second components of said command signal to provide a resultant command signal;
said filtering, amplification and processing of signals representative of amplitude limited airspeed error and wind shear compensated inertial longitudinal acceleration tuned to provide cancellation of said first and second command signal components resulting from turbulence induced airspeed error signals and inertial longitudinal acceleration signals.

10. In combination with an aircraft control system an automatic speed control system employing a throttle servo responsive to signals representative of airspeed error relative to a selectable control reference speed and inertial longitudinal acceleration for reducing said airspeed error to zero:
first means for receiving, amplitude limiting and filtering said airspeed error signal;
second means for receiving, compensating for wind shear and filtering said inertial longitudinal acceleration signal;
third means for processing said amplitude limited and filtered airspeed error signal to provide a first component of the throttle servo command signal resulting in a rate of change of throttle position proportional to said amplitude limited and filtered airspeed error signal;
fourth means for processing said wind shear compensated and filtered inertial longitudinal acceleration signal to provide a second component of the throttle servo command signal resulting in a rate of change of throttle position proportional to said wind shear compensated and filtered inertial longitudinal acceleration signal;
fifth means for processing said wind shear compensated and filtered inertial longitudinal acceleration signal to provide a third component of the throttle servo command signal resulting in a change in throttle position proportional to said wind shear compensated and filtered inertial longitudinal acceleration signal; and
sixth means for combining said first, second, and third component of the throttle servo command signal to provide a resultant throttle servo command signal.

11. The combination according to claim 10 wherein said amplitude limiting means is selected to provide airspeed control with a transient acceleration limit of about 1 kt/second.

12. The combination according to claim 10 wherein said filtering and processing for said first, second, and third components of the throttle servo command signal are tuned to provide mutual cancellation of said components when said components result from turbulence induced airspeed error and inertial longitudinal acceleration signals.

13. In combination with an aircraft control system, an automatic speed control system having a throttle servo responsive to a throttle position command signal, comprising:

first means for receiving, amplitude limiting and filtering a signal representative of airspeed error relative to a selectable command speed;

second means for receiving, compensating for wind shear and filtering a signal representative of inertial longitudinal acceleration;

third means for amplifying, combining and integrating said amplitude limited and filtered airspeed error signal and said wind shear compensated and filtered inertial longitudinal acceleration signal to provide a first component of said throttle position command signal;

fourth means for amplifying and further filtering said wind shear compensated and filtered inertial longitudinal acceleration signal to provide a second component of said throttle position command signal;

fifth means for combining said signals representative of said first and second component of the throttle position command signal to provide a resultant throttle position command signal for coupling to said throttle servo.

14. The combination of claim 13, wherein said throttle servo utilizes a throttle rate signal feedback coupled to said integrating means to provide a signal component representative of change in throttle position.

15. The combination of claim 13 wherein said means for compensating said inertial longitudinal acceleration signal for wind shear comprises:

a washout-lag circuit responsive to signals representative of airspeed error and inertial longitudinal acceleration and providing at the output thereof a signal representative of the difference between the lagged inertial longitudinal acceleration and the lagged rate of change of the airspeed error, said output signal representing the rate of change of the velocity of the air relative to the earth;

a rate limited lag circuit coupled in series with the output of said washout-lag circuit for providing a wind shear compensation signal representative of the sustained rate of change of the velocity of the air relative to the earth and substantially free from turbulence noise; and means for subtracting said wind shear compensation signal representative of the sustained rate of change of the velocity of the air relative to the earth from said inertial longitudinal acceleration signal to provide wind shear compensated inertial longitudinal acceleration signal.

16. The combination of claim 15 wherein said washout-lag circuit has a time constant in the order of 0.2 seconds, the rate-limited-lag circuit has a loop gain in the order of 0.2 and a rate limit allowing a maximum rate of change of the output of said rate limited lag circuit in the order of (0.2 knot/second)/second.

17. The combination according to claim 13 wherein said filtering and amplifying of signals representative of amplitude limited airspeed error and wind shear compensated inertial longitudinal acceleration are tuned to provide mutual cancellation of said first and second throttle position command signal components when said components result from turbulence induced airspeed error and inertial longitudinal acceleration signals.

18. The combination of claim 13 wherein said airspeed error filter time constant is in the order of 0.5 second, the time constant of said filter coupled in series with said means providing the wind shear compensated inertial longitudinal acceleration signal is in the order of 0.8 second and wherein the time constant of said further filter for said wind shear compensated and filtered inertial longitudinal acceleration signal in the throttle displacement control path is in the order of 0.5 second.

19. An automatic speed control system comprising in combination:

integrator circuit means having an input terminal and an output terminal;

first summing circuit means for providing the gain weighted sum of a processed airspeed error signal and a processed airspeed control damping signal, said means having an output terminal;

synchronizing amplifier means having an input terminal and an output terminal;

switching means having a first input terminal connected to the output of said first summing circuit means, a second input terminal connected to the output terminal of said synchronizing amplifier means and an output terminal;

second summing means having a first input connected to the output terminal of said switching means, a second input terminal and an output terminal;

integrator circuit means having an input terminal connected to the output terminal of said second summing means and an output terminal;

third summing means having a first input terminal connected to said output terminal of said integrator circuit means, a second input terminal receiving a separately processed airspeed control damping signal and an output terminal connected to said input terminal of said synchronizing amplifier means;

servo means having an input terminal coupled to the output terminal of said third summing circuit means and an output terminal coupled to the engine throttle levers for driving said throttle levers;

switching logic means for switching the connection of said first input signal to said second summing means from the output terminal of said means for providing the gain weighted sum of the processed control signals to said output terminal of said synchronizing amplifier means upon reaching either forward or aft throttle limit and for switching back upon a change in sign of said signal representing the gain weighted sum of processed airspeed error and inertial longitudinal acceleration signals; and, means providing a signal representation of the rate of change of throttle lever position for feeding back into said second input terminal of said second summing means.

20. In combination in an autothrottle control system for an aircraft:

first means for providing a signal representative of airspeed error;

second means for providing a signal representative of longitudinal acceleration;

first adder circuit means having first and second input terminals and an output terminal;

first limiter circuit means;

first amplifier circuit means;

first filter circuit means;

said first limiter circuit means, first amplifier circuit means and first filter circuit means coupled in series circuit between said first means for providing a signal representative of airspeed error and said first input terminal of said first adder circuit means;

second adder circuit means having first and second input terminals and an output terminal, said first input terminal coupled to said second means for providing a signal representative of longitudinal acceleration;

rate limited lag circuit means having an input terminal and an output terminal;

washout and lag circuit means, including third adder circuit means, first integrator circuit means, fourth adder circuit means and second amplifier circuit means, said third adder circuit means having a first input terminal connected to said second means providing a signal representative of longitudinal acceleration and a second input terminal connected in feedback to the output terminal of said second amplifier, said integrator circuit means connected with its input terminal to the output terminal of said third adder circuit means and its output terminal to a first input terminal of said fourth adder circuit means, said fourth adder circuit having a second input terminal connected to said first means providing a signal representative of airspeed error and an output terminal connected to the input terminal of said second amplifier means, said second amplifier means having an output terminal;

said rate limited lag circuit including a fifth adder circuit means having a first input terminal connected to said output terminal of said second amplifier means and a second input terminal and an output terminal, a second limiter circuit means having an input terminal connected to said output of said fifth adder circuit means and an output terminal, a third amplifier circuit means having an input terminal connected to said output terminal of said second limiting circuit means and an output terminal, a second integrator circuit means having an input terminal connected to said output terminal of said third amplifier means and an output terminal coupled back to said second input terminal of said fifth adder circuit means, said output terminal of said rate limited lag circuit means also coupled to said second input terminal of said second adder circuit means;

second filter circuit means having an input terminal and an output terminal, said input terminal connected to said output terminal of said second adder circuit means;

fourth amplifier circuit means coupled between said output terminal of said second filter circuit means and said second input terminal of said first adder circuit means;

sixth adder circuit means having first and second input terminals and an output terminal;

third integrator circuit means having an input terminal and an output terminal;

seventh adder circuit means having first and second input terminals and an output terminal;

said input terminal of said third integrator circuit means coupled to said output terminal of said sixth adder circuit means, said output terminal of said integrator circuit means coupled to said first input terminal of said seventh adder circuit means;

throttle servo means coupled in series between the output of said seventh adder circuit means and the propulsion means for the aircraft;

synchronizing amplifier means having an input terminal and an output terminal, said input terminal coupled to the output terminal of said seventh adder circuit means;

tachometer means having an input terminal coupled to the output of said servo means, and an output terminal coupled to said second input terminal of said sixth adder circuit means;

switching means coupling said first input terminal of said sixth adder circuit means to said output terminal of said first adder circuit means or to said output terminal of said synchronizing amplifier means; and, switching logic means for controlling said switching means to couple said output terminal of said synchronizing amplifier to said first input terminal of said sixth adder circuit means when either forward or aft throttle limit is reached, and to couple said output terminal of said first adder circuit means to said first input terminal of said sixth adder circuit means when the sign of the signal present at the output terminal of said first adder circuit changes thereby indicating a servo command to drive the throttle out of its limit position.

* * * * *

UNITED STATES PATENT OFFICE
CERTIFICATE OF CORRECTION

Patent No. 3,840,200　　　　　　　　　　Dated October 8, 1974

Inventor(s) Antonius A. Lambregts

It is certified that error appears in the above-identified patent and that said Letters Patent are hereby corrected as shown below:

Column 2 Line 34: $V_E = V_{E_{t=0}} \cdot e^{-t/\tau_1}$

Column 3 Line 18: ideal rate of change called for by the equation: $K_1 V_E$

Column 3 Line 51: to inertial longitudinal acceleration of the aircraft $(\dot{V}_b)$ Column 4 Line 19: $K_1 V_E + K_2 \dot{V}_b$ becomes $K_1(V_E + \tau_1 \dot{V}_b) = K_1\{\tau_2 S/(\tau_2 S$ Column 4 Line 20: $+1)\Delta V_{airmass} - \tau_1 S/(\tau_2 S+1) \Delta V_{airmass}\}$ and this Column 5 Line 29: can be made satisfactory for values of $\tau$ less than 10

Column 5 Line 54: however the signal $\Delta \dot{V}$ has a substantial turbulence 60: therefore $\hat{\dot{V}} = \dot{V}_b$ Column 6, 51: means 58, the shear correction term $\Delta \dot{V}$ is detected 63: hear performance. This allows $\Delta \dot{V}$ to be built up with Column 8, 13: position $\delta_T$ is a ramp function. Mathematically the 20: obtained using the tachometer signal $K_T S \delta_T = K_T \dot{\delta}_T$, 21: which is then integrated in circuit 16 yielding $K_T \dot{\delta}_T / S$ Signed and Sealed this eighteenth Day of November 1975

[SEAL]

Attest:

RUTH C. MASON　　　　　　　　　C. MARSHALL DANN
Attesting Officer　　　　　　　　Commissioner of Patents and Trademarks

UNITED STATES PATENT OFFICE
CERTIFICATE OF CORRECTION

Patent No. 3,840,200  Dated October 8, 1974

Inventor(s) Antonius A. Lambregts

It is certified that error appears in the above-identified patent and that said Letters Patent are hereby corrected as shown below:

Column 2 Line 23: $\dot{\delta}T_{CMD} = K_1 \{V_E + (K_2/K_1) \dot{V}_b\} = K_1 E$ Column 2 Line 26: $E = V_E + (K_2/K_1) \dot{V}_b$ or $\dot{V}_b = (-K_1/K_2) V_E$ Column 4 Line 11: $V_E/(\Delta V_{airmass}) = \tau_2/(\tau_2 S + 1)$ Column 4 Line 15: and $\dot{V}_b/(\Delta V_{airmass}) = -S/(\tau_2 S + 1)$ assuming the air -

Column 4 Line 50: $(\delta_T)_{\dot{V}_b} = \{K_2/S + K_3/(0.5 S + 1)\} \dot{V}_b$ Column 4 Line 56: $(\delta_T)_{V_E} = [K_1 / \{(0.5 + 1) S\}] V_E$ Column 5 Line 10: mentioned $V_E$ and $\dot{V}$ lags included and is: $\delta_{T_{CMD}} = -\{K_1$ Column 5 Line 11: $V_E/(0.5 S + 1) + K_2 \hat{\dot{V}}/(0.8 S + 1)\} \cdot 1/S - K_3 \hat{\dot{V}}/\{(0.8 S +$ Column 5 Line 12: $1)(0.5 S + 1)\}$ Column 5 Line 57: In Fig. 3: $\hat{\dot{V}} = \dot{V}_b - \Delta \dot{V} = \dot{V}_b - (\dot{V}_b - S V_E)/(S + K_4)$ Column 6 Line 19: the transfer function $V_E/\Delta V_{wind}$ and $\Delta \delta_T/\Delta V_{wind}$

UNITED STATES PATENT OFFICE
CERTIFICATE OF CORRECTION

Patent No. 3,840,200 n      Dated October 8, 1974

Inventor(s) Antonius A. Lambregts      Page 2 of 2

It is certified that error appears in the above-identified patent and that said Letters Patent are hereby corrected as shown below:

Column 6, line 32: for short periods of time. These high values of $\dot{V}_E$ in

Signed and Sealed this

Seventeenth Day of May 1977

[SEAL]

Attest:

RUTH C. MASON  
Attesting Officer

C. MARSHALL DANN  
Commissioner of Patents and Trademarks